Jan. 8, 1935.  A. E. MICHENER  1,987,122
LIQUID FILLING MACHINE
Filed Jan. 29, 1931  4 Sheets-Sheet 1

Inventor
Arthur E. Michener
By William James
Atty.

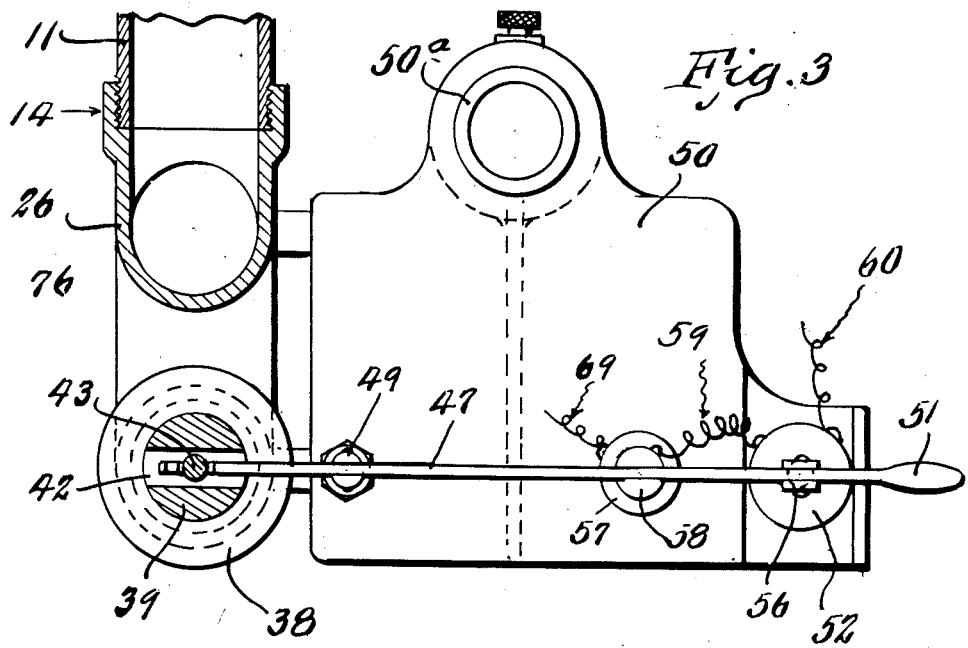
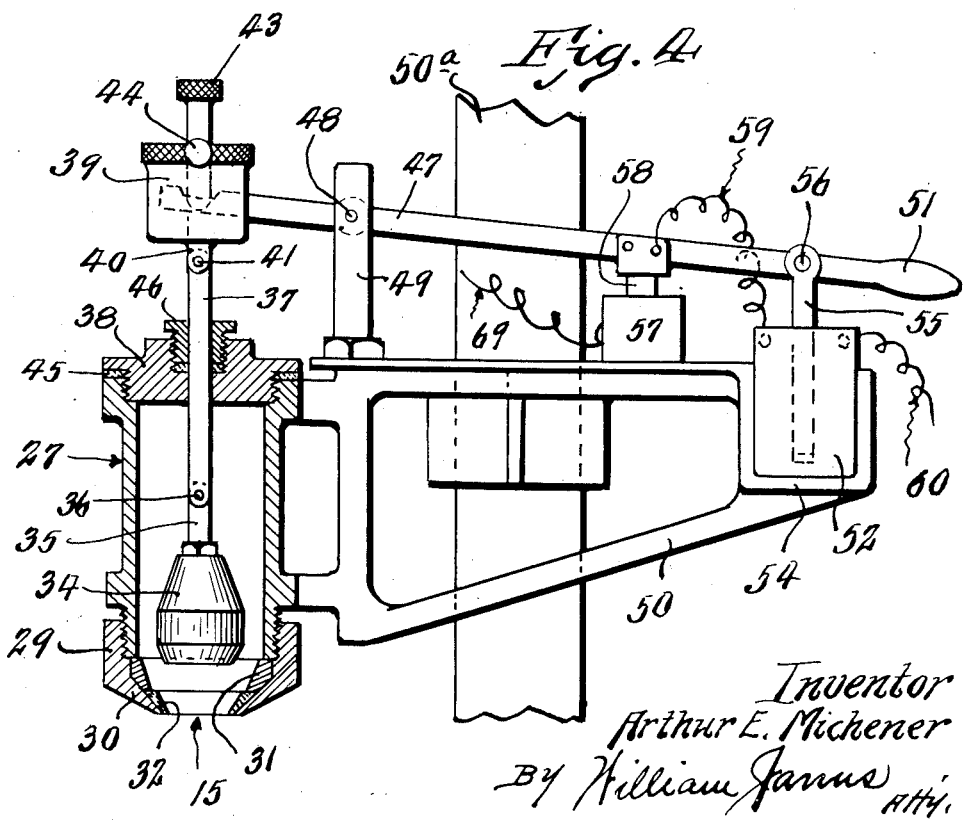

Jan. 8, 1935.  A. E. MICHENER  1,987,122
LIQUID FILLING MACHINE
Filed Jan. 29, 1931  4 Sheets-Sheet 3
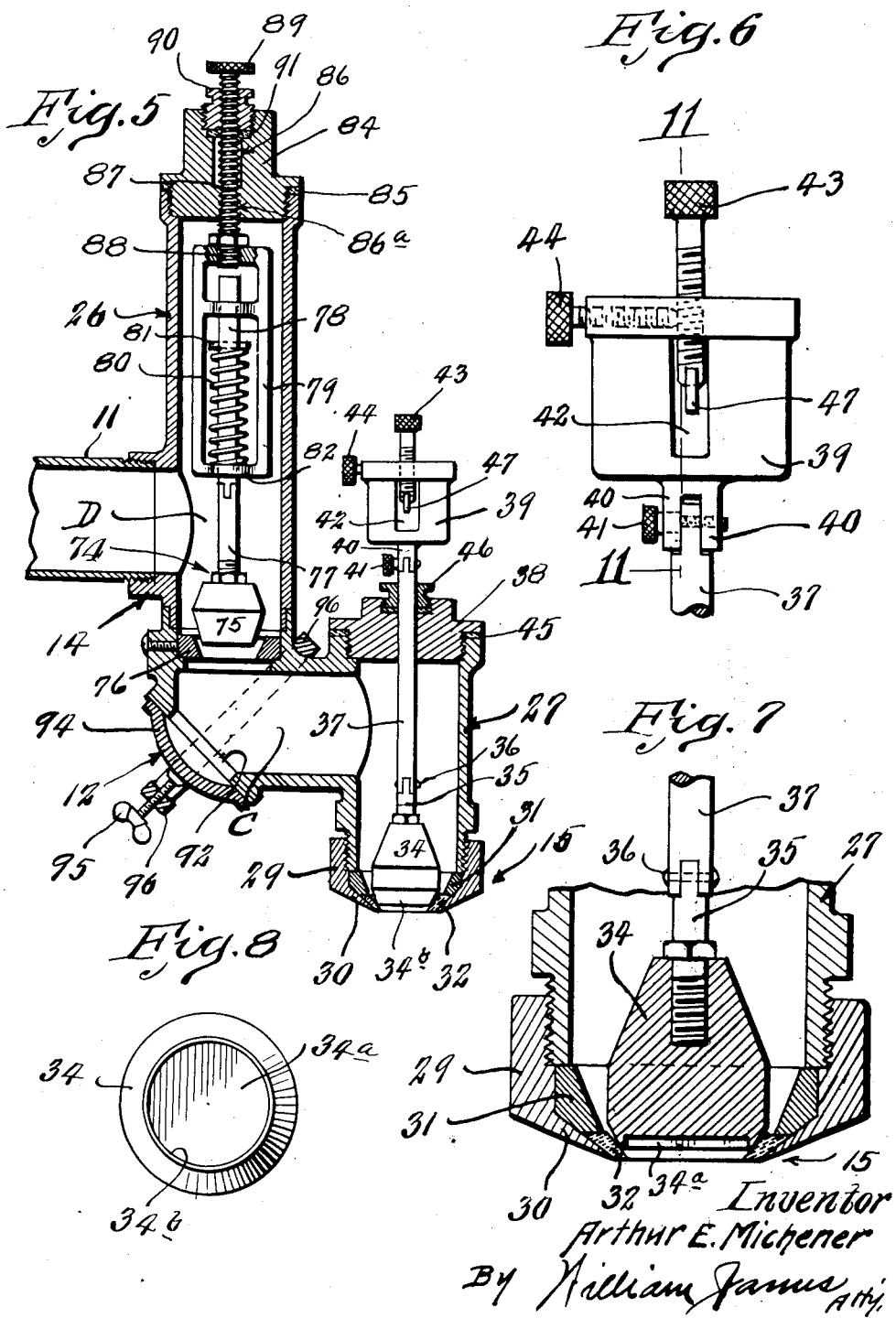

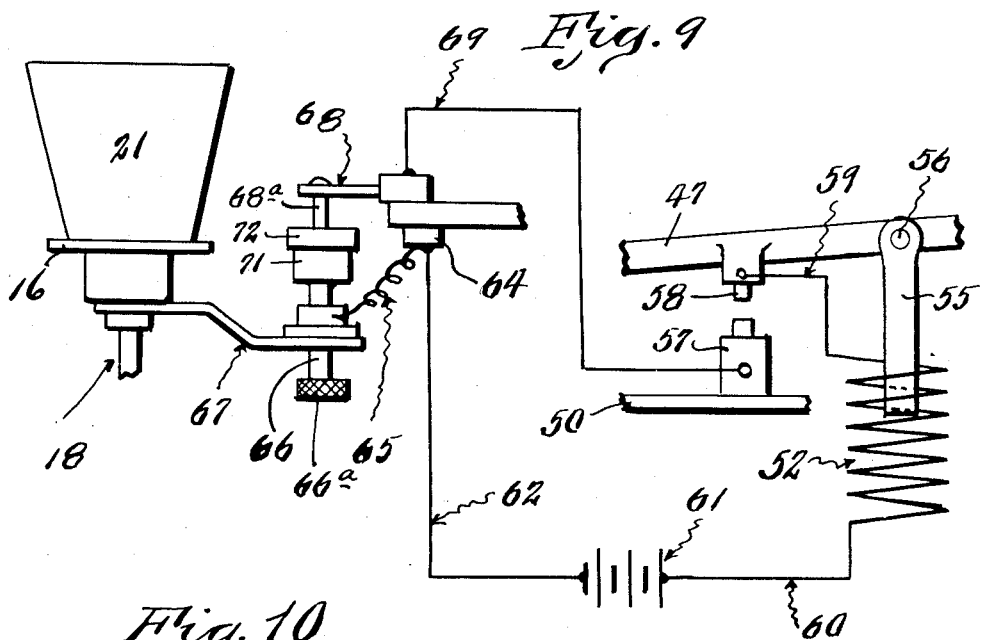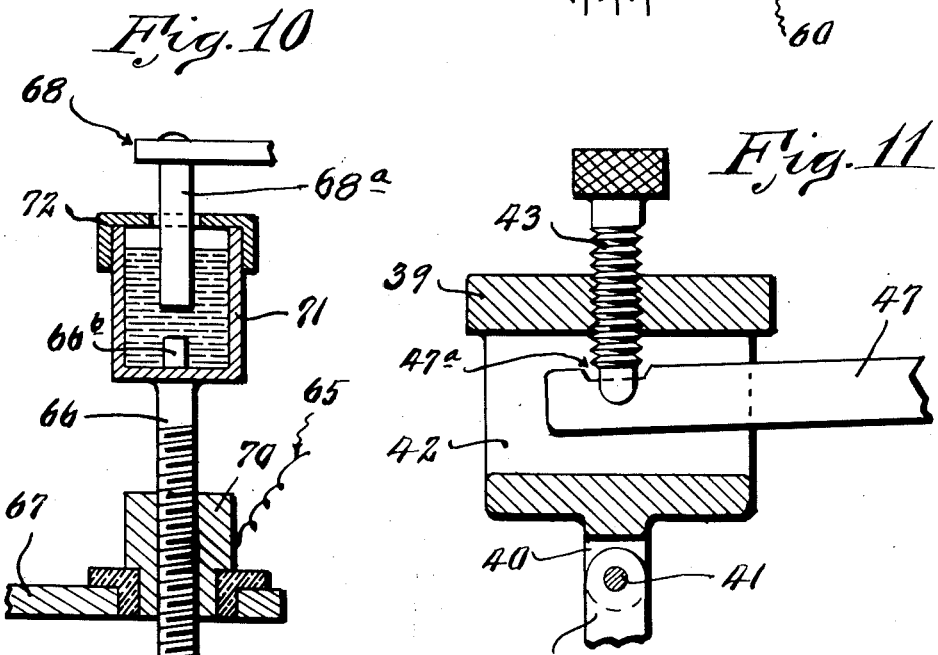

Patented Jan. 8, 1935

1,987,122

UNITED STATES PATENT OFFICE 1,987,122

LIQUID FILLING MACHINE

Arthur E. Michener, Bellevue, Ohio

Application January 29, 1931, Serial No. 512,053

6 Claims. (Cl. 249—63)

This invention relates to new and useful improvements in liquid filling machines.

One of the objects of the invention is to provide a liquid filling machine by means of which liquid is conveyed from a suitable source of supply and is discharged into a suitable container in predetermined amounts having definite weights, said filling machine being accurate in operation regardless of the height of the supply tank or the amount of liquid contained therein, the accuracy of the machine being within the tolerance of the United States Bureau of Standards.

Other objects of the invention are to provide a liquid filling machine arranged in cooperative relation with a weighing scale whereby a predetermined amount of liquid equivalent in weight to the load for which said scale is set is discharged into a container carried by said scale.

Further objects of the invention are to provide visible means for check weighing each filled container before it is removed from the scale.

Still other objects of the invention are to provide in combination with a source of supply a liquid filling machine, including a scale mechanism and valve mechanism, said scale mechanism carrying a container to be filled and controlling said valve mechanism so that the flow of liquid is shut off when the amount of liquid contained in the container reaches a predetermined amount or definite weight.

Another object of the invention is to provide a liquid filling machine having automatically operable means for maintaining a uniform discharge of liquid regardless of the pressure fluctuations at the source of supply of said liquid.

Still another object of the invention is to provide a valve mechanism controlled by a movable part of a scale for shutting off the flow of liquid when a predetermined amount thereof has been discharged into a container carried by said scale and to provide automatically operable means interposed between the source of supply and said valve mechanism for compensating for the variable liquid pressure produced in said source of supply whereby a uniform flow of liquid is assured at all times by the discharge end of said valve mechanism.

Additional objects of the invention are to provide a cut-off valve so constructed as to prevent dripping or after-flow of the liquid when said valve occupies closed position.

With these and other objects in view, my invention consists in certain novel features of construction and arrangement of parts, hereinafter more fully described and claimed, and illustrated in the accompanying drawings, in which—

Figure 3 is an enlarged horizontal cross section taken on line 3—3 of Figure 2.

Figure 4 is a side elevation, partly in cross section, of a portion of Figure 3.

Figure 5 is a vertical cross section taken on line 5—5 of Figure 2.

Figure 6 is an enlarged fragmentary view of the shut-off valve weight and its lever connection.

Figure 7 is an enlarged vertical cross section taken through the shut-off valve and its seat.

Figure 8 is a bottom plan view of the shut-off valve showing the lower or recessed end thereof.

Figure 9 is a diagrammatic view showing the electrical connections and parts associated therewith of my liquid filling machine.

Figure 10 is a fragmental cross section of the contact member carried by a movable part of the scale.

Figure 11 is a vertical cross section taken on line 11—11 of Figure 6.

Figure 1:
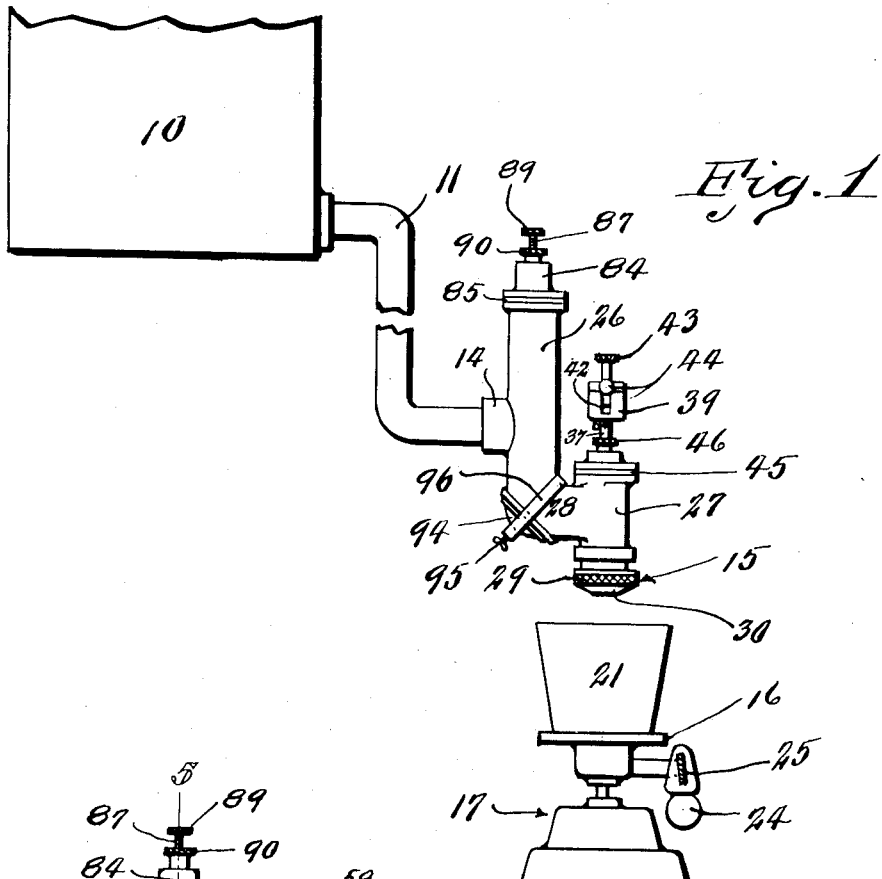
Figure 1 is a side elevational view of my improved machine.
Figure 2:
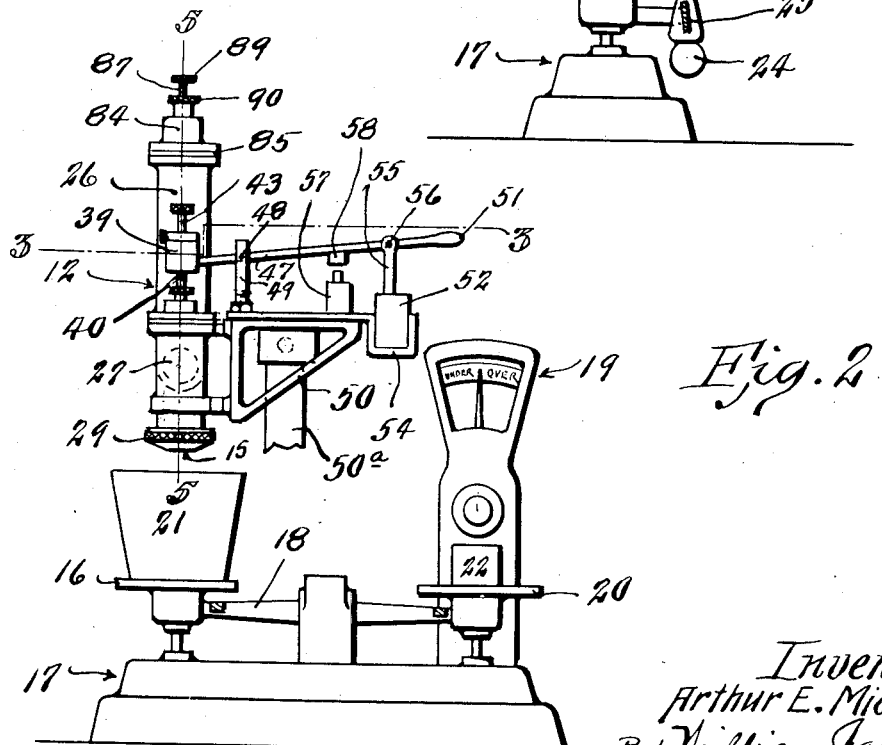
Figure 2 is a front elevational view thereof.

The present invention is primarily intended for use in filling containers of various sizes and styles with an amount of liquid having a definite weight. The invention is suitable for use in connection with liquids and semi-liquid substances, such as syrups, oils, alcohols, varnishes, paints, shellacs, lacquers, various chemicals in liquid forms, petroleum products, lard, polishes, liquid soups, and cracked eggs.

The invention contemplates the provision of a weighing scale having weight indicating means and being operatively connected to a shut-off valve of a filling mechanism so as to effect the release of said valve, whereby the latter is moved by gravity to its seat and shuts off the discharge of liquid, when the container located on said scale receives a predetermined amount of liquid.

The liquid is supplied to the filling mechanism by a suitable pipe connection which communicates with a suitable source of supply. Preferably this source of supply is located a suitable distance above the filling mechanism so that the liquid is fed by gravity to the latter.

Referring by numerals to the accompanying drawings, 10 indicates a tank or other suitable source of supply of liquid which can be located at a point remote from the filling operations. A pipe 11 leads from the lower end of said tank and has its lower end connected to a filling device 12, as indicated at 14. This device is provided with a discharge end or filling nozzle 15 which opens downwardly and is located a suitable distance above a load platform 16 of a weighing scale 17. This scale is preferably of the even balance type, such as described in U. S. Patent No. 1,405,634 and includes a beam 18 and a weight indicating means 19 operatively associated with said beam and designed to indicate the balance as well as over and under weight. Load platform 16 is carried by one end of said beam, while a load offsetting or weight platform 20 is carried by the other end of said beam. A suitable container 21 is placed on platform 16 and a weight 22 is placed on the platform 20. This load offsetting member 22 is equivalent in weight to the weight of the liquid to be placed in said container.

The weighing scale is of the even balance type and when the container is placed on the load platform the sliding poise 24 is adjusted on graduated beam 25 to compensate for the weight of the container and return the scale back in balance. The weight 22 is then placed on the weight platform 20 and the device 12 is operated to allow liquid to flow therefrom into the container. When the proper amount of liquid is received in the container to bring the scale back in balance, the filling device 12 is automatically shut off.

This filling device or casing consists of two tubular members 26 and 27. Tubular member or reservoir 26 is connected to the lower end of pipe 12 through the extension 14. Tubular member or filling head 27, the lower end of which forms the filling nozzle or outlet 15, is provided with a lateral extension 28 which opens upwardly and receives the lower end of said reservoir 26 (see Figure 5). Thus the liquid is conveyed from the source of supply or tank 10 through pipe 11 and member 26 to filling head 27 from which it is discharged through the lower end 15 thereof.

This filling nozzle or outlet consists of a sleeve 29 which is screw-seated on the lower threaded end of member 27 and is provided with an inwardly presented flange 30 which supports and serves to clamp in position a valve guide 31 and a valve seat 32. This seat is comparatively thin and is preferably formed of leather.

A valve 34 operates within the lower end of head 27 and is adapted to engage said seat 32 and close the discharge end 15 of said member 27. A valve stem 35 extends upwardly from said valve 34 and is pivotally connected, as indicated at 36, to the lower end of a stem 37. This stem extends upwardly through member 27 and projects outwardly through a plug 38 which is screw-seated in and closes the upper end of member 27.

A weight 39 is arranged above head 27 and is provided on its lower end with a pair of depending ears 40 which are pivotally connected by a pin or screw 41 to the upper projecting end of stem 37. This weight is provided with a vertically disposed slot 42. An adjusting screw 43 is screw-seated in the upper end of weight 39 and extends downwardly into said slot. A locking screw 44 is screw-seated in the upper end of said weight radially thereof and serves to bear against said adjusting screw 43 and lock it in adjusted position.

Thus valve 34 is normally held to its seat and closes the discharge end 15 by the action of said weight 39. The pivotal connections 36 and 41 permit slight angular movements of the valve 34 and weight 39, respectively, with relation to stem 37, which latter moves in axial direction only.

Preferably a washer or packing gland 45 is used to seal the joint between the open end of member 27 and plug 38 and a packing gland 46 is used to seal the opening in plug 38.

The vertically disposed slot 42 in weight 39 receives the outer end of a lever 47 and the lower slotted end of screw 43 extends into said slot 42 and bears against the seat 47ª formed in the outer end of said lever.

This lever is fulcrumed at 48 on the upper end of a vertically disposed pin 49 which latter extends upwardly from a bracket 50. This bracket is detachably secured to one side of member 27 and is supported in any suitable manner, such as by a stand pipe 50ª. The opposite end of lever 47 terminates in a handle 51 by means of which said lever can be manually operated. A solenoid 52 is supported by extension 54 of bracket 50 and a core 55 operating in said solenoid has its upper end pivotally connected to lever 47 near the handle 51 thereof as indicated at 56.

A stationary electrical contact 57 is arranged on bracket 50 and a contact 58 is carried by lever 47 and is adapted to engage, when said lever is manually depressed, contact 57. Contact 58 is connected by a flexible electrical connection 59 to one terminal of solenoid 52, the other terminal of said solenoid being connected by a wire connection 60 to one pole of a source of electrical energy 61. The other pole of said source is connected by a wire connection 62 to a fixed part of the scale as indicated at 64 but is insulated therefrom. A flexible connection 65 extends from this contact 64 and connects to a movable contact member 66 which is mounted by means of an arm 67 on beam 18 adjacent to the load end thereof. A stationary contact member 68 is mounted on a stationary part of the scale and is adapted to cooperate with contacts 66. A wire connection 69 extends from contact 68 and connects to stationary contact 57.

The weight 39 serves to maintain valve 34 in closed position and handle 51 of lever 47 in raised position. In this position, contacts 57 and 58 are disengaged from each other, thereby opening the circuit of solenoid 52 and the core 55 thereof occupies raised position. When the handle 51 is depressed into position shown in Figure 4, lever 39 is raised upwardly and valve 34 is unseated. If the electrical circuit of the solenoid 52 is closed, said solenoid is energized and holds the core 55 in depressed position, thereby maintaining the parts 39, 47 and 34 in raised positions. If, however, the circuit is not completed, said parts will not remain in this position but will move back to normal or closed positions.

Contacts 66 and 68 are so arranged that when the beam 18 occupies balanced position, or the load end of said beam occupies depressed position, said contacts are disengaged, thereby maintaining the circuit of the solenoid open independently of contacts 57 and 58. When, however, the load end of the beam moves upwardly, as when a weight is placed on the weight end of the beam and an empty container on the load end of the beam, contact 66 engages contact 68. If the lever 47 is now manually operated, contact 58 engages contact 57, thereby completing the electrical circuit so that solenoid 52 becomes energized and causes core 55 to remain in moved position, thereby holding the lever 47, weight 39, and valve 34 in opened or raised positions. This condition will be maintained so long as the load end of the beam is disposed above the horizontal plane thereof or, in other words, until such time as the material placed on container 21 balances the weight 22. As soon as this happens, the load end of the beam is caused to move downwardly, thereby breaking the contact between contact members 66 and 68 and opening the circuit of the solenoid 52. Thus it will be seen that in order to maintain valve 34 in open position, it is necessary to have a weight 22 on the weight end of the beam before lever 47 can be operated to remain in moved position.

Contact 66 is in the form of a screw which is screw-threaded in a sleeve 70 carried by and insulated from member 67. The lower end of screw contact 66 is provided with a knurled head 66ᵃ to permit easy manipulation thereof. The upper end of said contact 66 carries a cup 71, the bottom of which is provided with an upwardly presented contact projection 66ᵇ. Fixed contact 68 has a depending portion 68ᵃ which extends into said cup and is adapted to be engaged by projection 66ᵇ. Cup 71 is filled with oil to eliminate spark-arcing between the contacts and the upper end of said cup is preferably closed by a cover 72 having a central opening through which the depending contact portion 68ᵃ extends into said cup. Thus it will be seen that the retention of valve 34 in open position depends upon the closing of two sets of electric contacts, namely, 57 and 58, and 66 and 68. Also it will be noted that the first set of contacts is closed by the manual operation of lever 47 in opening the valve 34 and that the second set of contacts is closed automatically by the upward movement of platter 16 when weight 22 is placed on platter 20, preparatory to the weighing operation.

To retain the valve 34 in open position, the manual operation of lever 47 has to follow the placement of weight 22 on platter 20. In other words, contacts 66 and 68 have to be closed in addition to the closure of contacts 57 and 58 to obtain energization of the solenoid 52 and the consequent retention of arm 47 in operative position with valve 34 unseated.

When sufficient liquid is discharged into the container 21 to balance the weight 22, beam 18 is actuated, causing downward movement of platter 16 and member 67, thereby disengaging contacts 66 and 68 from each other and breaking the circuit of the solenoid 52. The lever 47 being no longer held in operative position by the solenoid, moves under the influence of weight 39 into normal position, thereby reseating valve 34 and shutting off the flow of liquid from the discharge nozzle into container 21.

It is desirable to insure a uniform flow of liquid through the outlet 15. For this reason the liquid contained in chamber C of member 27 has to be maintained at uniform pressure. Inasmuch as the tank 10 is located above the filling device and its elevation with respect to said device may vary with different installations and also due to the fact that the level of the liquid in said tank will vary as the liquid is discharged therefrom the pressure under which the liquid is supplied to the filling device will vary accordingly. It is, therefore, necessary to provide compensating means which is automatically adjustable in accordance with the variable liquid pressure so that a uniform pressure is maintained in chamber C. To this end a compensating means 74 is arranged in chamber D of member 26 and this means controls the communication between said chambers D and C so that the amount of liquid admitted from chamber D to chamber C is regulated in accordance with the liquid pressure prevailing in said chamber D.

This compensating means comprises a valve 75 which is adapted to engage a seat 76 arranged in the upwardly presented end of extension 28 and controlling the communication between chambers D and C. Valve 75 is secured to the lower end of a stem 77, the upper end of which has a pivotal connection with the lower end of a rod 78. This rod extends upwardly and is slidably arranged in a frame 79 vertically arranged in said tubular member 26. A coiled spring 80 is disposed on rod 78 and the upper end of said spring bears against a projection or pin 81 fixed on said rod, while the lower end of said spring bears against the lower end of said frame, as indicated at 82. Thus the tension of the spring serves to hold valve 75 in raised position away from seat 76.

The upper end of rod 78 terminates a suitable distance below the upper end of frame 79 and is free to move longitudinally in said frame.

The upper end of tubular member 26 is closed by a screw plug 84, there being a gasket 85 provided to insure tight joint between member 26 and plug 84. This plug is provided with an axial bore 86 which is screw-threaded in its lower end, as indicated at 86a. A screw 87 is screw-seated in said threaded bore and extends downwardly below plug 84 and has its lower end secured to the upper end of frame 79 as indicated at 88.

The upper end of the screw projects outwardly from plug 84 and terminates in a knurled knob 89 by means of which said screw can be operated to adjust said frame in a vertical plane. As the valve 75 by virtue of the jointed rods 77 and 78 is carried by said frame, it is obvious that the adjustment of the latter will position said valve relatively to its seat and consequently reduce or increase the opening connecting the chambers D and C.

The upper end of plug 84 is provided with a screw threaded recess in which is screw-seated a packing gland 90 and a gasket 91 to insure proper seal for the screw 87.

The tension of spring 80 is such that when the liquid pressure applied to said valve is increased, said spring yields and permits the valve to move closer to its seat in accordance with the pressure. When the liquid pressure is reduced, said spring moves the valve away from the seat 76, thereby increasing the opening between chambers D and C.

Thus the cross sectional area of the opening connecting the two chambers is automatically regulated in accordance with the pressure under which the liquid is supplied to the filling device with the result that the liquid is admitted to the chamber C in predetermined volume and at a uniform pressure regardless of the variation in the pressure of the liquid as supplied to chamber D.

Thus when the liquid supplied by connection 11 is under great pressure, valve 75 moves downwardly to restrict the opening, thereby reducing the volume of liquid in accordance with the increase in flow, and when the liquid pressure is reduced, valve 75 moves away from the seat, thereby increasing the opening to compensate for the reduction in flow.

This compensating means is highly desirable in the operation of my filling device since the liquid pressure is gradually reduced as the level of the liquid in the tank is lowered by the discharge of the liquid.

The adjustment furnished by screw 87 permits the device to be used in conjunction with tanks located at different elevations with respect to the filling device and allows individual adjustment of each filling device in accordance with the location of the tank. When this adjustment is made it does not have to be disturbed so long as the relationship of the tank to the filling device is not changed and the compensating valve 75 takes care of the variations in the pressure produced by the variable level of the liquid.

Preferably both the shut-off valve 34 and the compensating valve 75 are formed somewhat similar in shape, the upper half of each valve being in the form of a truncated cone and the lower half being in the shape of an inverted truncated cone so that each valve is substantially of greatest diameter along its medial line and tapers toward each end.

The guide 31 is disposed at different angle with respect to the lower end of valve 34 so that said valve does not come in surface contact with it. The valve seat 32 is comparatively thin and valve 34 has a limited surface contact with it. This arrangement is desirable to prevent after-flow or drip after the valve is seated.

Where a surface contact is provided the liquid is squeezed outwardly from between the surfaces and drops from the discharge nozzle or outlet. In the present construction, due to the particular construction of the shut-off valve and its seat, this condition does not exist.

In order to increase the efficiency of the shut-off valve and prevent drip of the liquid, the lower end or the underside of said valve is provided with a pocket or recess 34$^a$ so that said end of the valve terminates in a comparatively thin annular flange 34$^b$ which forms an air pocket and prevents dripping of the liquid after the valve is seated. The valve seat formed by washer 32 is comparatively thin and substantially flush with the lower end of the shut-off sleeve 29.

My improved filling and pressure control device insures absolute accuracy in filling operations regardless of the height of supply tank with respect to the filling head or the level of the liquid in the tank. The accuracy of the device is well within the tolerance required by the United States Bureau of Standards. The device can be readily connected and all the operating parts are easily accessible by removing the reservoir or member 28 from the filling head 27. The inside surfaces of the reservoir and the filling head are smooth and there are no air chambers or pockets or sharp corners which would be difficult to clean.

To facilitate cleaning of the device, and particularly of the extension 28 and member 26, the knee of said extension is cut away to provide an obliquely disposed opening 92 through which easy access can be obtained to said extension and to member 26. A cover 94 is used to close said opening. This cover is held in position by a screw 95, the inner end of which bears against said cover. A bail 96 arranged on said extension 26 perpendicularly to said opening and screw 95 is screw-seated therein and adapted to be drawn against said cover and hold it against said opening.

The flow of the liquid is stopped at the extreme end of the filling nozzle or outlet, thereby eliminating sputter of the liquid or the after-flow or drip. The mechanism for operating the shut-off valve is very sensitive and operates immediately. The intake of the liquid can be readily regulated by adjusting the screw 87.

The removable features of sleeve 29 and the other parts of the discharge nozzle permit easy cleaning thereof and of the discharge chamber of member 27. The provision of clean-out opening 92 and the removable cover 94 therefor provide easy access to connection 28 and compensating chamber in member 26 for cleaning purposes. All of the parts of the device, with the exception of valve seat 32, are made of metal so that it can be readily cleaned. Valve seat 32 is formed of leather and can be renewed when necessary. These features not only insure sanitary condition of the device when it is used in connection with food products, but they also permit the use of the same device in connection with various liquids.

While I have described and shown herein the preferred form of my filling device, it is obvious that various changes and arrangement of parts can be made and substituted for those herein shown without departing from the spirit of my invention.

I claim:

1. A liquid filling device comprising in combination with a weighing scale, of a liquid discharge member having its outlet disposed above the load platform of said scale, a valve seat arranged in said discharge member adjacent to said outlet, a valve operatively arranged in said discharge member and automatically operable to engage said seat and close said outlet, a lever associated with said valve and manually operable for moving the latter into open position, an electrical energized member cooperating with said lever for holding the latter in valve open position, an electric circuit for energizing said electrical member, a stationary contact interposed in said circuit, a movable contact fixed to said lever and adapted to engage said stationary contact and close said circuit when said lever occupies valve opening position, and a second set of contacts interposed in said circuit and comprising a fixed contact and a movable contact carried by a movable part of said weighing scale and held thereby in engagement with said stationary contact when said scale occupies unbalanced position and adapted to move away from said stationary contact and break said circiut when said scale reaches balanced position, whereby said electrical member is energized and said lever is held in valve open position during the unbalanced condition of said scale and said electrical member is de-energized and said lever is released to move into valve closing position when said scale reaches balanced condition.

2. A liquid filling device comprising in combination a weighing scale, a liquid discharge member having its discharge nozzle disposed above the load platform of said scale, a valve arranged within said discharge member for controlling said nozzle, a valve stem carrying said valve and extending outwardly from said discharge nozzle, means associated with said stem for automatically maintaining said valve in closed position, a manually operable lever associated with said valve stem for moving said valve into open position, an electro-responsive means, a core fixed to said lever and operable by said electro-responsive means when energized to hold said lever in valve open position, an electric circuit for energizing said electro-responsive means, a switch interposed in said circuit and operatively associated with said lever for closing said circuit when said lever is manually operated into valve open position and for opening said circuit when said lever is moved into valve closing position, a fixed contact interposed in said circuit adjacent to said scale, and a movable contact fixed to a movable part of said weighing scale and engaging said fixed contact when said scale is in unbalanced condition, said movable contact being adapted to move away from said fixed contact to break said circuit when said scale reaches balanced condition, thereby deenergizing said electro-responsive means and cause said lever to move into valve closing position.

3. In a liquid filling machine, the combination with a weighing scale, of a filling head having its inlet adapted to be connected with a suitable source of liquid supply, a discharge nozzle removably arranged on said filling head above the load platform of said scale, a leather valve seat removably secured in said filling head by said discharge nozzle, a valve in said filling head adapted to engage said seat and close said discharge nozzle, means for urging said valve into closed position, a manually operable lever associated with said valve for moving the latter into open position against the influence of said means, an electro-responsive means operatively associated with said manually operable lever for holding said lever when energized in valve open position, an electric-circuit for energizing said electro-responsive means, a first set of contacts interposed in said circuit and comprising a fixed contact and a movable contact, the latter being carried by said lever and movable into engagement with said fixed contact to complete said circuit when said lever is manually operated into valve open position, and a second set of contacts interposed in said circuit and comprising a fixed contact member and a movable contact member, the latter being carried by a movable part of said scale, said last-mentioned contact members being normally in engagement with each other to close the circuit during the unbalanced condition of the scale and being disengaged from each other to break the circuit when said scale reaches balanced condition.

4. In a liquid filling machine, the combination with a weighing scale, of a filling head having its inlet adapted to be connected with a suitable source of liquid supply, a discharge nozzle removably arranged on said filling head above the load platform of said scale, a valve seat arranged in said filling head and held in position by said discharge nozzle, a valve in said filling head adapted to engage said seat and close said discharge nozzle, means for urging said valve into closed position, a manually operable member associated with said valve for moving the latter into open position against the influence of said means, an electro-responsive means operatively associated with said manually operable member for retaining it when energized in valve open position, an electric circuit for energizing said electro-responsive means, a switch interposed in said circuit and operatively associated with a movable part of said scale and movable thereby into circuit closing position when said scale occupies unbalanced position and into circuit opening position when said scale reaches balanced position, and a second switch arranged in said circuit in series with the first switch and operatively associated with said manually operable member and operable thereby into circuit closing position when said member occupies valve open position.

5. In a liquid filling device, the combination of a weighing scale including a beam and a load platform carried thereby, a liquid discharge member having its outlet disposed above said load platform, a discharge valve in said member for opening and closing said outlet, a valve stem secured to said discharge valve and extending outwardly from said member, a lever operatively connected to said stem, said lever being gravity-actuated to close said discharge valve and being manually operable to open said valve, a solenoid adapted to be energized and cooperating with said lever for holding the latter in valve open position, an electric circuit for energizing said solenoid, a first pair of contacts interposed in said circuit and comprising a fixed contact and a movable contact, the latter being carried by said lever and movable into engagement with said fixed contact to close said circuit when the lever is manually moved into valve open position, and a second set of contacts interposed in said circuit and including a fixed member and a movable member, the latter being carried by said scale beam and held in engagement with said fixed member during the time said scale is in unbalanced condition, said movable member being movable away from said fixed member to break said circuit when said scale assumes balanced condition, whereby when said lever is manually operated to open said valve it is held in this position by the energized solenoid provided said scale is in unbalanced condition and whereby said solenoid is deenergized and said lever is gravity-actuated into valve closing position when said scale reaches balanced condition.

6. In a liquid filling device of the class described, the combination of a weighing scale including a scale beam and a load platform carried thereby, a supply tank, a discharge member having an outlet disposed above said load platform, a pipe connection between said tank and said discharge member, a valve in said discharge member for closing the outlet thereof, a valve stem carrying said valve and extending outwardly from said discharge member, a lever fulcrum adjacent to said discharge member and having one end operatively associated with said valve stem, means associated with said lever and said valve stem for urging said valve into closing position, a solenoid associated with said lever and adapted when energized to hold said lever in valve open position, an electric circuit for energizing said solenoid, a fixed contact interposed in said circuit, a movable contact interposed in said circuit and fixed to said lever and adapted when the latter is moved into valve open position to engage said fixed contact and complete said circuit whereby said solenoid is energized, a fixed contact member interposed in said circuit and arranged on said scale, a movable contact member interposed in said circuit and fixed to said scale beam and adapted to engage said fixed contact member when said scale is in unbalanced condition and adapted to disengage said fixed contact member when said scale attains balanced condition.

ARTHUR E. MICHENER.